US008614280B2

(12) United States Patent
Witt et al.

(10) Patent No.: US 8,614,280 B2
(45) Date of Patent: Dec. 24, 2013

(54) METHOD FOR THE CONTINUOUS PRODUCTION OF BIODEGRADABLE POLYESTERS

(75) Inventors: Uwe Witt, Mutterstadt (DE); Motonori Yamamoto, Mannheim (DE)

(73) Assignee: BASF SE (DE)

( * ) Notice: Subject to any disclaimer, the term of this patent is extended or adjusted under 35 U.S.C. 154(b) by 35 days.

(21) Appl. No.: 12/988,127

(22) PCT Filed: Apr. 7, 2009

(86) PCT No.: PCT/EP2009/054116
§ 371 (c)(1),
(2), (4) Date: Oct. 15, 2010

(87) PCT Pub. No.: WO2009/127556
PCT Pub. Date: Oct. 22, 2009

(65) Prior Publication Data
US 2011/0039999 A1    Feb. 17, 2011

(30) Foreign Application Priority Data
Apr. 15, 2008    (EP) .................................... 08154541

(51) Int. Cl.
C08G 63/00    (2006.01)
(52) U.S. Cl.
USPC ........... 525/437; 525/410; 525/411; 525/415; 525/450; 525/418; 525/419; 528/272; 528/298; 528/296; 528/302; 528/307; 528/308; 528/308.6
(58) Field of Classification Search
USPC ......... 525/410, 411, 415, 450, 418, 419, 437; 528/272, 298, 296, 302, 307, 308, 528/308.6
See application file for complete search history.

(56) References Cited

U.S. PATENT DOCUMENTS

| 4,758,650 | A | 7/1988 | Schulz Van Endert | |
|---|---|---|---|---|
| 5,779,986 | A | 7/1998 | Van Endert et al. | |
| 6,297,347 | B1 * | 10/2001 | Warzelhan et al. | 528/272 |
| 6,303,677 | B1 | 10/2001 | Warzelhan et al. | |
| 6,812,321 | B1 * | 11/2004 | Heitz et al. | 528/309.1 |
| 7,115,701 | B2 * | 10/2006 | Schultz Van Endert et al. | 528/271 |
| 7,244,806 | B2 | 7/2007 | Wilhelm et al. | |
| 2004/0014883 | A1 * | 1/2004 | Yamamoto et al. | 524/599 |

FOREIGN PATENT DOCUMENTS

| DE | 19509551 A1 | 9/1996 |
|---|---|---|
| DE | 19929790 A1 | 1/2001 |
| DE | 102005053068 A1 | 5/2007 |
| EP | 0719582 A2 | 7/1996 |
| JP | 62-260823 A | 11/1987 |
| JP | 2504039 A | 11/1990 |
| JP | 2004-190020 A | 7/2004 |
| JP | 2005-519141 A | 6/2005 |
| JP | 2006-507377 A | 3/2006 |
| JP | 2006-233375 A | 9/2006 |
| JP | 2008-045117 A | 2/2008 |
| WO | WO-92/09654 A2 | 6/1992 |
| WO | WO-96/15173 A1 | 5/1996 |
| WO | WO-03/042278 A1 | 5/2003 |
| WO | WO-2005/042615 A1 | 5/2005 |

OTHER PUBLICATIONS

International Preliminary Report on Patentability issued in International Application No. PCT/EP2009/054116 (English and non-English copies), mailing date Oct. 28, 2010.

* cited by examiner

*Primary Examiner* — Robert Jones, Jr.
(74) *Attorney, Agent, or Firm* — Novak Druce Connolly Bove + Quigg LLP

(57) ABSTRACT

A process for the continuous production of a biodegradable polyester, where
a mixture of aliphatic dihydroxy compounds, aliphatic and aromatic dicarboxylic acids or their liquid esters, and, optionally, further comonomers is mixed, without addition of a catalyst, to give a paste, and
i) this mixture with at least a portion of the catalyst, is continuously esterified or, transesterified;
ii) the transesterification or, esterification product obtained in i) is continuously precondensed with any remaining amount of catalyst to an intrinsic viscosity of from 20 to 70 cm$^3$/g;
iii) the product obtainable from ii) is continuously polycondensed to an intrinsic viscosity of from 60 to 170 cm$^3$/g, and
iv) the product obtainable from iii) is reacted continuously with a chain extender in a polyaddition reaction to an intrinsic viscosity of from 150 to 320 cm$^3$/g.
The invention further relates to biodegradable polyesters obtained by this process.

16 Claims, No Drawings

METHOD FOR THE CONTINUOUS PRODUCTION OF BIODEGRADABLE POLYESTERS

CROSS REFERENCE TO RELATED APPLICATIONS

This application is a national stage application under 35 U.S.C. §371 of PCT/EP2009/054116, filed Apr. 7, 2009, which claims benefit to European application 08154541.0, filed Apr. 15, 2008, the entire disclosures of which are hereby incorporated by reference.

The present invention relates to a process for the continuous production of a biodegradable polyester based on aliphatic or aliphatic and aromatic dicarboxylic acids and on aliphatic dihydroxy compounds, where
a mixture composed of the aliphatic dihydroxy compounds, of the aliphatic and aromatic dicarboxylic acids, and, if appropriate, of further comonomers (component C) is mixed, without addition of a catalyst, to give a paste, or, as an alternative, the liquid esters of the dicarboxylic acids are fed into the system, as also are the dihydroxy compound and, if appropriate, further comonomers, without addition of any catalyst, and
  i) in a first stage, this mixture, together with the entire amount or with a portion of the catalyst, is continuously esterified or, respectively, transesterified;
  ii) in a second stage, the transesterification or, respectively, esterification product obtained in i) is continuously pre-condensed if appropriate with the remaining amount of catalyst town intrinsic viscosity of from 20 to 70 $cm^3/g$ to DIN 53728;
  iii) in a third stage, the product obtainable from ii) is continuously polycondensed to an intrinsic viscosity of from 60 to 170 $cm^3/g$ to DIN 53728, and
  iv) in a fourth stage, the product obtainable from iii) is reacted continuously with a chain extender D in a polyaddition reaction to an intrinsic viscosity of from 150 to 320 $cm^3/g$ to DIN 53728.

In particular, the invention relates to a process for the continuous preparation of a biodegradable polyester based on aliphatic and aromatic dicarboxylic acids and on aliphatic dihydroxy compounds, where
a mixture composed of the aliphatic dihydroxy compounds, of the aliphatic and aromatic dicarboxylic acids, and, if appropriate, of further comonomers (component C) is mixed, without addition of a catalyst, to give a paste, or, as an alternative, the liquid esters of the dicarboxylic acids are fed into the system, as also are the dihydroxy compound and, if appropriate, further comonomers, without addition of any catalyst, and
  i) in a first stage, this mixture, together with the entire amount or with a portion of the catalyst, is continuously esterified or, respectively, transesterified;
  ii) in a second stage, the transesterification or, respectively, esterification product obtained in i) is continuously pre-condensed if appropriate with the remaining amount of catalyst to an intrinsic viscosity of from 20 to 60 $cm^3/g$ to DIN 53728;
  iii) in a third stage, the product obtainable from ii) is continuously polycondensed to an intrinsic viscosity of from 70 to 130 $cm^3/g$ to DIN 53728, and
  iv) in a fourth stage, the product obtainable from iii) is reacted continuously with a chain extender D in a polyaddition reaction to an intrinsic viscosity of from 160 to 250 $cm^3/g$ to DIN 53728.

The invention further relates to biodegradable polyesters which are accessible for the first time by this process.

The prior art for the production of biodegradable polyesters based on aliphatic and aromatic dicarboxylic acids and on aliphatic dihydroxy compounds in particular describes batch processes (WO-A 92/09654 and WO-A 96/15173). A disadvantage of these is that the aliphatic/aromatic polyesters require a relatively long residence time in the reaction vessel at high temperatures in order to reach high molecular weight—the desired intrinsic viscosity being greater than 160 $cm^3/g$ to DIN 53728. A result of the long residence times at high temperatures is a certain amount of degradation of the sensitive aliphatic/aromatic polyesters. The acid number of the polyesters rises rapidly and can easily reach values greater than 1.6 mg KOH/g. High acid numbers cause problems during the subsequent chain-extension process (particularly using isocyanates). It then becomes impossible to achieve higher molecular weights. Materials of this type achieve only low viscosities, and often have fish eyes and cannot then be used for numerous injection-molding or extrusion applications. Finally, biodegradable polyesters with high acid number have very limited hydrolysis resistance.

The literature describes efficient, continuous processes for the production of aromatic polyesters, such as PET and PBT (see, for example, WO 03/042278 and DE-A 199 29 790). However, these cannot be directly transferred to aliphatic/aromatic polyesters. Firstly, the aromatic polyesters often have relatively high acid numbers, and secondly the problem of hydrolysis resistance is less severe in aromatic polyesters than in aliphatic/aromatic polyesters.

It was an object of the present invention, accordingly, to provide an industrial process which permits the production of biodegradable aliphatic or aliphatic/aromatic (semiaromatic) polyesters with intrinsic viscosities to DIN 53728 of from 150 to 320 and acid numbers to DIN EN 12634 smaller than 1.2 mg KOH/g, preferably smaller than 1.0 mg KOH/g. Other factors of great importance for an industrial process are processability and cost-effectiveness (product yield and space/time yield).

Surprisingly, the continuous, 4-stage process mentioned in the introduction achieves every aspect of the object.

One preferred embodiment of the process of the invention moreover for the first time permits provision of biodegradable semiaromatic polyesters with intrinsic viscosities greater than 160 $cm^3/g$ and acid numbers smaller than 1.0 mg KOH/g, and with MVR smaller than 6.0 $cm^3/10$ min (measured at 190° C., with a weight of 216 kg). These are substantially more resistant to hydrolysis than the biodegradable polyesters described for example in WO-A 96/15173. The polyesters are therefore easier to process. This moreover provides access to new application sectors including those in mixtures with other biopolymers that are susceptible to hydrolysis, examples being PLA (polylactide); PHA (polyhydroxyalkanoates), PBS (polybutylene succinate), and starch.

Biodegradable polyesters are aliphatic and semiaromatic polyesters—as described by way of example in WO-A 96/15173 and DE-A 10 2005053068.

In particular, biodegradable polyesters are aliphatic/aromatic polyesters whose structure is as follows:
A) an acid component composed of
  a1) from 30 to 99 mol % of at least one aliphatic dicarboxylic acid or its esters, or a mixture thereof,
  a2) from 1 to 70 mol % of at least one aromatic dicarboxylic acid or its esters, or a mixture thereof, and
  a3) from 0 to 5 mol % of a compound comprising sulfonate groups, where the total of the molar percentages of components a1) to a3) is 100%, and B) a diol component composed of:
b1) at least equimolar amounts with respect to component A of a $C_2$-$C_{12}$ alkanediol, or a mixture thereof, and
b2) from 0 to 2% by weight, based on the amount of polyester after stage iii (which corresponds to the amount used of components A and B minus the reaction vapors removed), of a compound comprising at least 3 functional groups;
and, if appropriate, one or more components selected from C) a component selected from
c1) at least one dihydroxy compound comprising ether functions and having the formula I

where n is 2, 3 or 4 and m is a whole number from 2 to 250,
c2) at least one hydroxycarboxylic acid of the formula IIa or IIb

where p is a whole number from 1 to 1500 and r is a whole number from 1 to 4, and G is a radical selected from the group consisting of phenylene, —$(CH_2)_q$—, where q is a whole number from 1 to 5, —C(R)H— and —C(R)HCH$_2$, where R is methyl or ethyl,
c3) at least one amino-$C_2$-$C_{12}$ alkanol, or at least one amino-$C_5$-$C_{10}$ cycloalkanol, or a mixture of these,
c4) at least one diamino-$C_1$-$C_8$ alkane,
c5) at least one aminocarboxylic acid compound selected from the group consisting of caprolactam, 1,6-aminocaproic acid, laurolactam, 1,12-aminolauric acid, and 1,11-aminoundecanoic acid,
or mixtures composed of c1) bis c5),
and D) from 0.01 to 4% by weight, based on the amount of polyester after stage iii, of at least one component selected from the group d1) to d4)
d1) of a di- or oligofunctional isoscyanate and/or isocyanurate,
d2) of a di- or oligofunctional peroxide,
d3) of a di- or oligofunctional epoxide,
d4) of a di- or oligofunctional oxazoline, oxazine, caprolactam, and/or carbodiimide;

E) from 0 to 10% by weight, based on the amount of polyester after stage iii of a component selected from the group e1) to e3)
e1) of a lubricant, such as erucamide or a stearate,
e2) of a nucleating agent, such as calcium carbonate, polyethylene terephthalate, or polybutylene terephthalate,
e3) of an aliphatic polyester selected from the group consisting of: polylactic acid, polycaprolactone, polyhydroxyalkanoate.

In one preferred embodiment, the acid component A of the semiaromatic polyesters comprises from 30 to 70 mol %, in particular from 40 to 60 mol %, of a1 and from 30 to 70 mol %, in particular from 40 to 60 mol %, of a2. In one particularly preferred embodiment, the acid component A of the semiaromatic polyesters comprises more than 50 mol % of aliphatic dicarboxylic acid a1). A feature of these polyesters is excellent biodegradability.

Aliphatic acids and the corresponding derivatives a1 which may be used are generally those having from 2 to 40 carbon atoms, preferably from 4 to 14 carbon atoms. They may be either linear or branched. The cycloaliphatic dicarboxylic acids which may be used for the purposes of the present invention are generally those having from 7 to 10 carbon atoms and in particular those having 8 carbon atoms. In principle, however, it is also possible to use dicarboxylic acids having a larger number of carbon atoms, for example having up to 30 carbon atoms.

Examples which may be mentioned are: malonic acid, succinic acid, glutaric acid, 2-methylglutaric acid, 3-methylglutaric acid, adipic acid, pimelic acid, suberic acid, azelaic acid, sebacic acid, undecanedioic acid, dodecanedioic acid, brassylic acid, tetradecanedioic acid, fumaric acid, 2,2-dimethylglutaric acid, suberic acid, dimer fatty acid (e.g. Empol® 1061 from Cognis), 1,3-cyclopentanedicarboxylic acid, 1,4-cyclo-hexanedicarboxylic acid, 1,3-cyclohexanedicarboxylic acid, diglycolic acid, itaconic acid, maleic acid, maleic anhydride, and 2,5-norbornanedicarboxylic acid.

Ester-forming derivatives of the abovementioned aliphatic or cycloaliphatic dicarboxylic acids which may also be used and which may be mentioned are in particular the di-$C_1$-$C_6$-alkylesters, such as dimethyl, diethyl, di-n-propyl, diisopropyl, di-n-butyl, diisobutyl, di-tert-butyl, di-n-pentyl, diisopentyl or di-n-hexylesters. It is also possible to use anhydrides of the dicarboxylic acids.

The dicarboxylic acids or their ester-forming derivatives may be used here individually or in the form of a mixture composed of two or more of these.

It is preferable to use succinic acid, adipic acid, azelaic acid, sebacic acid, brassylic acid, or their respective ester-forming derivatives, or a mixture thereof. It is particularly preferable to use succinic acid, adipic acid, or sebacic acid, or their respective ester-forming derivatives, or a mixture thereof. It is particularly preferable to use adipic acid or its ester-forming derivatives, for example its alkyl esters or a mixture of these. Sebacic acid or a mixture of sebacic acid with adipic acid is preferably used as aliphatic dicarboxylic acid when polymer mixtures having "hard" or "brittle" components ii), such as polyhydroxybutyrate or in particular polylactide, are produced. Succinic acid or a mixture of succinic acid with adipic acid is preferably used as aliphatic dicarboxylic acid when producing polymer mixtures with "soft" or "tough" components ii), examples being polyhydroxybutyrate-co-valerate or poly-3-hydroxybutyrate-co-4-hydroxybutyrate.

Succinic acid, azelaic acid, sebacic acid, and brassylic acid have the additional advantage of being available in the form of renewable raw materials.

Aromatic dicarboxylic acids a2 which may be mentioned are generally those having from 8 to 12 carbon atoms and preferably those having 8 carbon atoms. By way of example, mention may be made of terephthalic acid, isophthalic acid, 2,6-naphthoic acid and 1,5-naphthoic acid, and also ester-forming derivatives of these. Particular mention may be made here of the di-$C_1$-$C_6$-alkylesters, e.g. dimethyl, diethyl, di-n-propyl, diisopropyl, diisobutyl, di-tert-butyl, di-n-pentyl, diisopentyl, or di-n-hexylesters. The anhydrides of the dicarboxylic acids a2 are also suitable ester-forming derivatives.

However, in principle it is also possible to use aromatic dicarboxylic acids a2 having a greater number of carbon atoms, for example up to 20 carbon atoms.

The aromatic dicarboxylic acids or ester-forming derivatives of these a2 may be used individually or as a mixture of two or more of these. It is particularly preferable to use terephthalic acid or its ester-forming derivatives, such as dimethyl terephthalate.

The compound used comprising sulfonate groups is usually one of the alkali metal or alkaline earth metal salts of a dicarboxylic acid comprising sulfonate groups or ester-forming derivatives thereof, preferably alkali metal salts of 5-sulfoisophthalic acid or a mixture of these, particularly preferably the sodium salt.

According to one of the preferred embodiments, the acid component A comprises from 40 to 60 mol % of a1, from 40 to 60 mol % of a2, and from 0 to 2 mol % of a3.

The diols B are generally selected from branched or linear alkanediols having from 2 to 12 carbon atoms, preferably from 4 to 6 carbon atoms.

Examples of suitable alkanediols are ethylene glycol, 1,2-propanediol, 1,3-propanediol, 1,2-butanediol, 1,4-butanediol, 1,5-pentanediol, 1,6-hexanediol, 2,4-dimethyl-2-ethyl-1,3-hexanediol, 2,2-dimethyl-1,3-propanediol, 2-ethyl-2-butyl-1,3-propanediol, 2-ethyl-2-isobutyl-1,3-propanediol and 2,2,4-trimethyl-1,6-hexanediol, in particular ethylene glycol, 1,3-propanediol, 1,4-butanediol or 2,2-dimethyl-1,3-propanediol (neopentyl glycol); cyclopentanediol, 1,4-cyclohexanediol, 1,2-cyclohexanedimethanol, 1,3-cyclohexanedimethanol, 1,4-cyclohexanedimethanol or 2,2,4,4-tetramethyl-1,3-cyclobutanediol. Particular preference is given to 1,4-butanediol, in particular in combination with adipic acid as component a1) and 1,3-propanediol, in particular in combination with sebacic acid as component a1). 1,3-propanediol has the additional advantage of being obtainable in the form of a renewable raw material. It is also possible to use mixtures of different alkanediols.

The ratio of component b1 (diol) to diacids A generally set in stages i) and ii) of the process is from 1.5 to 2.5 and preferably from 1.8 to 2.2.

The compounds b2) preferably comprise crosslinking agents comprising at least three functional groups. Particularly preferred compounds have from three to six hydroxy groups. Examples that may be mentioned are: tartaric acid, citric acid, malic acid; trimethylolpropane, trimethylolethane; pentaerythritol; polyethertriols, and glycerol, trimesic acid, trimellitic acid, trimellitic anhydride, pyromellitic acid, and pyromellitic dianhydride. Preference is given to polyols, such as trimethylolpropane, pentaerythritol, and in particular glycerol. The compounds b2 can act as branching agents or else as crosslinking agents. By using components b2, it is possible to construct biodegradable polyesters which are pseudoplastic. The rheology of the melts improves; the biodegradable polyesters are easier to process, for example easier to draw by melt-solidification processes to give foils. The compounds b2 have a shear-thinning effect, and viscosity therefore decreases under load.

The amounts used of the compounds b2 are preferably from 0.01 to 2% by weight, with preference from 0.05 to 1% by weight, with particular preference from 0.08 to 0.20% by weight, based on the amount of polymer after stage iii).

The polyesters on which the polyester mixtures of the invention are based can comprise further components alongside components A and B.

Suitable dihydroxy compounds c1 are diethylene glycol, triethylene glycol, polyethylene glycol, polypropylene glycol and polytetrahydrofuran (polyTHF), particularly preferably diethylene glycol, triethylene glycol and polyethylene glycol, and mixtures of these may also be used, as may compounds which have different variables n (see formula I), for example polyethylene glycol which comprises propylene units (n=3), obtainable, for example, by using methods of polymerization known per se and polymerizing first with ethylene oxide and then with propylene oxide, and particularly preferably a polymer based on polyethylene glycol with different variables n, where units formed from ethylene oxide predominate. The molar mass ($M_n$) of the polyethylene glycol is generally selected within the range from 250 to 8000 g/mol, preferably from 600 to 3000 g/mol.

According to one of the preferred embodiments for producing the semiaromatic polyesters use may be made, for example, of from 15 to 98 mol %, preferably from 60 to 99.5 mol %, of the diols B and from 0.2 to 85 mol %, preferably from 0.5 to 30 mol %, of the dihydroxy compounds c1, based on the molar amount of B and c1.

Hydroxycarboxylic acid c2) that can be used for the production of copolyesters is: glycolic acid, D-, L-, or D,L-lactic acid, 6-hydroxyhexanoic acid, cyclic derivatives of these, such as glycolide (1,4-dioxane-2,5-dione), D- or L-dilactide (3,6-dimethyl-1,4-dioxane-2,5-dione), p-hydroxybenzoic acid, or else their oligomers and polymers, such as 3-polyhydroxybutyric acid, polyhydroxyvaleric acid, polylactide (for example that obtainable in the form of NatureWorks® (Cargill)), or else a mixture of 3-polyhydroxybutyric acid and polyhydroxyvaleric acid (the latter being obtainable as Biopol® from Zeneca) and, for producing semiaromatic polyesters, particularly preferably the low-molecular-weight and cyclic derivatives thereof.

Examples of amounts which may be used of the hydroxycarboxylic acids are from 0.01 to 50% by weight, preferably from 0.1 to 40% by weight, based on the amount of A and B.

The amino-$C_2$-$C_{12}$ alkanol or amino-$C_5$-$C_{10}$ cycloalkanol used (component c3) which for the purposes of the present invention also include 4-aminomethylcyclohexanemethanol, are preferably amino-$C_2$-$C_6$ alkanols, such as 2-aminoethanol, 3-amino-propanol, 4-aminobutanol, 5-aminopentanol or 6-aminohexanol, or else amino-$C_5$-$C_6$ cycloalkanols, such as aminocyclopentanol and aminocyclohexanol, or a mixture of these.

The diamino-$C_1$-$C_8$ alkanes (component c4) used are preferably diamino-$C_4$-$C_6$ alkanes, such as 1,4-diaminobutane, 1,5-diaminopentane or 1,6-diaminohexane (hexamethylenediamine, "HMD").

In one preferred embodiment for producing the semiaromatic polyesters, use may be made of from 0.5 to 99.5 mol %, preferably from 0.5 to 50 mol %, of c3, based on the molar amount of B, and of from 0 to 50 mol %, preferably from 0 to 35 mol %, of c4, based on the molar amount of B.

The component c5 used can comprise aminocarboxylic acids selected from the group consisting of caprolactam, 1,6-aminocaproic acid, laurolactam, 1,12-aminolauric acid, and 1,11-aminoundecanoic acid.

The amounts generally used of c5 are from 0 to 20% by weight, preferably from 0.1 to 10% by weight, based on the total amount of components A and B.

The component d1 used comprises an isocyanate or a mixture of various isocyanates. It is possible to use aromatic or aliphatic diisocyanates. However, it is also possible to use isocyanates of higher functionality.

For the purposes of the present invention, an aromatic diisocyanate d1 is especially tolylene 2,4-diisocyanate, tolylene 2,6-diisocyanate, diphenylmethane 2,2'-diisocyanate, diphenylmethane 2,4'-diisocyanate, diphenylmethane 4,4'-diisocyanate, naphthylene 1,5-diisocyanate, or xylylene diisocyanate.

Among these, particular preference is given to diphenylmethane 2,2'-, 2,4'-, or 4,4'-diisocyanate as component d1. The latter diisocyanates are generally used in the form of a mixture.

An isocyanate d1 that can also be used, having three rings, is tri(4-isocyanato-phenyl)methane. Polynuclear aromatic diisocyanates are produced by way of example during production of diisocyanates having one or two rings.

Component d1 can also comprise subordinate amounts of uretdione groups, for example up to 5% by weight, based on the total weight of component d1, for example for capping of the isocyanate groups.

For the purposes of the present invention, an aliphatic diisocyanate d1 is especially any of the linear or branched alkylene diisocyanates or cycloalkylene diisocyanates having from 2 to 20 carbon atoms, preferably from 3 to 12 carbon atoms, examples being hexamethylene 1,6-diisocyanate, isophorone diisocyanate, or methylenebis(4-isocyanatocyclohexane). Particularly preferred aliphatic diisocyanates d1 are isophorone diisocyanate and especially hexamethylene 1,6-diisocyanate.

Among the preferred isocyanurates are the aliphatic isocyanurates that derive from alkylene diisocyanates or from cycloalkylene diisocyanates, where these have from 2 to 20 carbon atoms, preferably from 3 to 12 carbon atoms, examples being isophorone diisocyanate or methylenebis(4-isocyanatocyclohexane). These alkylene diisocyanates can be either linear or branched compounds. Particular preference is given to isocyanurates based on n-hexamethylene diisocyanate, examples being cyclic trimers, pentamers, or higher oligomers of hexamethylene 1,6-diisocyanate.

The amounts generally used of component d1 are from 0.01 to 4% by weight, preferably from 0.05 to 2% by weight, particularly preferably from 0.2 to 1.2% by weight, based on the amount of polymer after stage iii).

Examples of suitable di- or oligofunctional peroxides (component d2) are the following compounds: benzoyl peroxide, 1,1-bis(tert-butylperoxy)-3,3,5-trimethylcyclohexane, 1,1-bis(tert-butylperoxy)methylcyclododecane, n-butyl 4,4-bis(butylperoxy)valerate, dicumyl peroxide, tert-butyl peroxybenzoate, dibutyl peroxide, α,α-bis(tert-butyl-peroxy)diisopropylbenzene, 2,5-dimethyl-2,5-di(tert-butylperoxy)hexane, 2,5-dimethyl-2,5-di(tert-butylperoxy)hex-3-yne, and tert-butylperoxycumene.

The amount used of component d2 is from 0.01 to 4% by weight, preferably from 0.1 to 2% by weight, and particularly preferably from 0.2 to 1% by weight, based on the biopolymer.

The component d3 used can comprise difunctional or oligofunctional epoxides, such as: hydroquinone, diglycidyl ether, resorcinol diglycidyl ether, 1,6-hexanediol diglycidyl ether, and hydrogenated bisphenol A diglycidyl ether. Other examples of epoxides comprise diglycidyl terephthalate, diglycidyl tetrahydrophthalate, diglycidyl hexahydrophthalate, dimethyldiglycidyl phthalate, phenylene diglycidyl ether, ethylene diglycidyl ether, trimethylene diglycidyl ether, tetramethylene diglycidyl ether, hexamethylene diglycidyl ether, sorbitol diglycidyl ether, polyglycerol polyglycidyl ether, pentaerythritol polyglycidyl ether, diglycerol polyglycidyl ether, glycerol polyglycidyl ether, trimethylolpropane polyglycidyl ether, resorcinol diglycidyl ether, neopentyl glycol diglycidyl ether, ethylene glycol diglycidyl ether, diethylene glycol diglycidyl ether, polyethylene glycol diglycidyl ether, propylene glycol diglycidyl ether, dipropylene glycol diglycidyl ether, polypropylene glycol diglycidyl ether, and polybutylene glycol diglycidyl ether.

A particularly suitable component d3a is a copolymer comprising epoxy groups and based on styrene, acrylic ester and/or methacrylic ester d3a. The units bearing epoxy groups are preferably glycidyl (meth)acrylates. Compounds that have proven advantageous are copolymers having a proportion of more than 20% by weight, particularly preferably more than 30% by weight, and with particular preference more than 50% by weight, of glycidyl methacrylate in the copolymer. The epoxy equivalent weight (EEW) in these polymers is preferably from 150 to 3000 g/equivalent, particularly preferably from 200 to 500 g/equivalent. The average molecular weight (weight average) $M_w$ of the polymers is preferably from 2000 to 25 000, in particular from 3000 to 8000. The average molecular weight (number average) $M_n$ of the polymers is preferably from 400 to 6000, in particular from 1000 to 4000. The polydispersity (Q) is generally from 1.5 to 5. Copolymers of the abovementioned type comprising epoxy groups are marketed by way of example by BASF Resins B.V. with trademark Joncryl® ADR. Particularly suitable chain extenders are Joncryl® ADR 4368, long-chain acrylates as described in EP Application No. 08166596.0, and Cardura®E10 from Shell.

The amount of component d3 used, based on the biopolymer, is from 0.01 to 4% by weight, preferably from 0.1 to 2% by weight, and particularly preferably from 0.2 to 1% by weight. Component d3 can also be used as acid scavenger. In this embodiment, it is preferable that the concentration used of d3 is from 0.01 to 0.5% by weight (stage iva), and that this is followed by chain extension using component d1, d2 and/or d3a (stage ivb), the concentration of which added is preferably from 0.2 to 1.2% by weight.

The component d4 used can comprise di- or oligofunctional oxazolines, oxazines, caprolactams, and/or carbodiimides.

Bisoxazolines are generally obtainable by the process disclosed in Angew. Chem. Int. Ed., vol. 11 (1972), pp. 287-288. Particularly preferred bisoxazolines and bisoxazines are those in which the bridging member is a single bond, a $(CH_2)_z$- alkylene group, where z=2, 3, or 4, e.g. methylene, ethane-1,2-diyl, propane-1,3-diyl, or propane-1,2-diyl, or a phenylene group. Particularly preferred bisoxazolines that may be mentioned are 2,2'-bis(2-oxazoline), bis(2-oxazolinyl)methane, 1,2-bis(2-oxazolinyl)ethane, 1,3-bis(2-oxazolinyl)propane or 1,4-bis(2-oxazolinyl)butane, in particular 1,4-bis(2-oxazolinyl)benzene, 1,2-bis(2-oxazolinyl)benzene or 1,3-bis(2-oxazolinyl)benzene. Further examples are: 2,2'-bis(2-oxazoline), 2,2'bis(4-methyl-2-oxazoline), 2,2'-bis(4,4'-dimethyl-2-oxazoline), 2,2'-bis(4-ethyl-2-oxazoline), 2,2'-bis(4,4'-diethyl-2-oxazoline), 2,2'-bis(4-propyl-2-oxazoline), 2,2'-bis(4-butyl-2-oxazoline), 2,2'-bis(4-hexyl-2-oxazoline), 2,2'-bis(4-phenyl-2-oxazoline), 2,2'-bis(4-cyclohexyl-2-oxazoline), 2,2'-bis(4-benzyl-2-oxazoline), 2,2'-p-phenylenebis(4-methyl-2-oxazoline), 2,2'-p-phenylenebis(4,4'dimethyl-2-oxazoline), 2,2'-m-phenylenebis(4-methyl-2-oxazoline), 2,2'-m-phenylenebis(4,4'-dimethyl-2-oxazoline), 2,2'-hexamethylenebis(2-oxazoline), 2,2'-octamethylenebis(2-oxazoline), 2,2'-decamethylenebis(2-oxazoline), 2,2'-ethylenebis(4-methyl-2-oxazoline), 2,2'-tetramethylenebis(4,4'-dimethyl-2-oxazoline), 2,2'-9,9'-diphenoxyethanebis(2-oxazoline), 2,2'-cyclohexylenebis(2-oxazoline), and 2,2'-diphenylenebis(2-oxazoline).

Preferred bisoxazines are 2,2'-bis(2-oxazine), bis(2-oxazinyl)methane, 1,2-bis(2-oxazinyl)ethane, 1,3-bis(2-oxazinyl)propane, or 1,4-bis(2-oxazinyl)butane, in particular 1,4-bis(2-oxazinyl)benzene, 1,2-bis(2-oxazinyl)benzene, or 1,3-bis(2-oxazinyl)-benzene.

Carbodiimides and polymeric carbodiimides are marketed by way of example by Lanxess with trademark Stabaxol® or by Elastogran with trademark Elastostab®.

Examples are: N,N'-di-2,6-diisopropylphenylcarbodiimide, N,N'-di-o-tolylcarbodiimide, N,N'-diphenylcarbodiimide, N,N'-dioctyldecylcarbodiimide, N,N'-di-2,6-dimethylphenylcarbodiimide, N-tolyl-N'-cyclohexylcarbodiimide, N,N'-di-2,6-di-tert-butylphenylcarbodiimide, N-tolyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-dicyclohexylcarbodiimide, N,N'-di-p-tolylcarbodiimide, p-phenylenebisdi-o-tolylcarbodiimide, p-phenylenebisdicyclohexylcarbodiimide, hexamethylenebisdicyclohexylcarbodiimide, 4,4'-dicyclohexylmethanecarbodiimide, ethylenebisdiphenylcarbodiimide, N,N'-benzylcarbodiimide, N-octadecyl-N'-phenylcarbodiimide, N-benzyl-N'-phenylcarbodiimide, N-octadecyl-N'-tolylcarbodiimide, N-cyclohexyl-N'-tolylcarbodiimide, N-phenyl-N'-tolylcarbodiimide, N-benzyl-N'-tolylcarbodiimide, N,N'-di-o-ethylphenylcarbodiimide, N,N'-di-p-ethylphenylcarbodiimide, N,N'-di-o-isopropylphenylcarbodiimide, N,N'-di-p-isopropylphenylcarbodiimide, N,N'-di-o-isobutylphenylcarbodiimide, N,N'-di-p-isobutylphenylcarbodiimide, N,N'-di-2,6-diethylphenylcarbodiimide, N,N'-di-2-ethyl-6-isopropylphenylcarbodiimide, N,N'-di-2-isobutyl-6-isopropylphenylcarbodiimide, N,N'-di-2,4,6-trimethylphenylcarbodiimide, N,N'-di-2,4,6-triisopropylphenylcarbodiimide, N,N'-di-2,4,6-triisobutylphenylcarbodiimide, diisopropylcarbodiimide, dimethylcarbodiimide, diisobutylcarbodiimide, dioctylcarbodiimide, tert-butylisopropylcarbodiimide, di-β-naphthylcarbodiimide, and di-tert-butylcarbodiimide.

The amount of component d4 used, based on the biopolymer, is from 0.01 to 4% by weight, preferably from 0.1 to 2% by weight, and particularly preferably from 0.2 to 1% by weight. Component d4 can also be used as acid scavenger. In this embodiment, it is preferable that the concentration used of d4 is from 0.01 to 0.5% by weight (stage iva), and that this is followed by chain extension using component d1, d2 and/or d3a (stage ivb), the concentration of which added is preferably from 0.2 to 1.2% by weight.

In one preferred embodiment of the process of the invention, between stages iii) and iv), or during stage iv), a component selected from the following group is added: lubricants (e1), nucleating agents (e2), and/or compatibilizers (e3). It is particularly preferable that component E is added at the end of stage iii).

Particular lubricants or mold-release agents (component e1) that have proven successful are hydrocarbons, fatty alcohols, higher carboxylic acids, metal salts of higher carboxylic acids, e.g. calcium stearate or zinc stearate, fatty acid amides, such as erucamide, and types of wax, e.g. paraffin waxes, beeswax or montan waxes. Preferred lubricants are erucamide and/or types of wax and particularly preferably combinations of these lubricants. Preferred types of wax are beeswaxes and ester waxes, in particular glycerol monostearate or dimethylsiloxane, or polydimethylsiloxane, e.g. Belsil® DM from Wacker. By adding the lubricants prior to chain extension, the lubricants can be linked to some extent to the polymer chain. This method can provide effective suppression of premature exudation of the lubricants from the finished polymer compositions.

The amount added of component e1 is generally from 0.05 to 2.0% by weight and preferably from 0.1 to 1.0% by weight, based on the polymer composition at the end of stage iii).

Nucleating agents (components e2) that can be used are generally inorganic compounds, such as talc, chalk, mica, silicon oxides, or barium sulfate. Compounds that have proven particularly successful for the polyesters of the invention are aromatic polyesters, such as polyethylene terephthalate and in particular polybutylene terephthalate. Surprisingly, it has been found that the nucleating agent e2 is substantially more effective when added after stage iii) than when added after stage iv). The amount used of the nucleating agent can be reduced to about half for the same technical effect, e.g. rapid crystallization and avoidance of tack. In other words, polymer compositions are obtained which, although they still have very good biodegradability by virtue of their low content of aromatic blocks, nevertheless are non-tacky by virtue of improved crystallization behavior.

The amount of component e2 added is generally from 0.05 to 10.0% by weight, preferably from 0.05 to 5.0% by weight, and particularly preferably from 0.1 to 1.0% by weight, based on the polymer composition at the end of stage iii).

Compatibilizers that have proved advantageous comprise aliphatic polyesters, such as polylactic acid, polycaprolactone, polyhydroxyalkanoate, or polyglycolic acid (PGA). When added at the end of stage iii), they can become linked to the polymer chain to some extent. Improved compatibility of the polymer mixtures is achieved when the aliphatic or semiaromatic polyesters are later mixed with these polyesters, such as polylactic acid, polycaprolactone, or polyhydroxyalkanoate, and it is often possible to omit use of further compatibilizers. If the aliphatic or semiaromatic polyesters are mixed after chain extension with one of the abovementioned mixing partners, the polymer components have less compatibility. In those instances, it is often necessary to add a compatibilizer to the polymer mixture.

The amount added of component e3 is generally from 0.05 to 15.0% by weight, preferably from 0.1 to 8.0% by weight, and with particular preference from 0.1 to 5.0% by weight, based on the polymer composition at the end of stage iii).

Particular preference is given to biodegradable semiaromatic polyesters which comprise, as aliphatic dicarboxylic acid (component a1)), succinic acid, adipic acid, or sebacic acid, esters thereof, or a mixture of these; as aromatic dicarboxylic acid (component a2)), terephthalic acid or its esters; as diol component (component B), 1,4-butanediol or 1,3-propanediol,
as component b2) glycerol, pentaerythritol, trimethylolpropane, and,
as component d1), hexamethylene diisocyanate.

The process of the invention can also be used to produce aliphatic polyesters. Aliphatic polyesters are polyesters made of aliphatic $C_2$-$C_{12}$ alkanediols and of aliphatic $C_4$-$C_{36}$ alkanedicarboxylic acids, such as polybutylene succinate (PBS), polybutylene adipate (PBA), polybutylene succinate adipate (PBSA), polybutylene succinate sebacate (PBSSe), polybutylene sebacate adipate (PBSeA), polybutylene sebacate (PBSe), or corresponding polyesteramides. The aliphatic polyesters are marketed by Showa Highpolymers as Bionolle and by Mitsubishi as GSPIa. EP08165370.1 describes more recent developments.

The intrinsic viscosities to DIN 53728 of the aliphatic polyesters produced by the process of the invention are generally from 150 to 320 $cm^3/g$ and preferably from 150 to 250 $cm^3/g$ auf.

The MVR (melt volume rate) to EN ISO 1133 (190° C., 2.16 kg weight) is in general from 0.1 to 70 $cm^3/10$ min, preferably from 0.8 to 70 $cm^3/10$ min, and in particular from 1 to 60 $cm^3/10$ min.

The acid numbers to DIN EN 12634 are generally from 0.01 to 1.2 mg KOH/g, preferably from 0.01 to 1.0 mg KOH/g, and with particular preference from 0.01 to 0.7 mg KOH/g.

The aliphatic and semiaromatic polyesters mentioned and the polyester mixtures of the invention are biodegradable.

For the purposes of the present invention, the feature "biodegradable" is achieved by a substance or a substance mixture if this substance or the substance mixture exhibits, as defined in DIN EN 13432, a percentage degree of biodegradation of at least 90%.

Biodegradation generally leads to decomposition of the polyesters or polyester mixtures in an appropriate and demonstrable period of time. The degradation can take place by an enzymatic, hydrolytic, or oxidative route, and/or via exposure to electromagnetic radiation, such as UV radiation, and can mostly be brought about predominantly via exposure to microorganisms, such as bacteria, yeasts, fungi, and algae. Biodegradability can be quantified by way of example by mixing polyester with compost and storing it for a particular period. By way of example, according to DIN EN 13432, $CO_2$-free air is passed through ripened compost during the composting process, and the compost is subjected to a defined temperature profile. The biodegradability here is defined as a percentage degree of biodegradation by way of the ratio of the net amount of $CO_2$ released from the specimen (after subtraction of the amount of $CO_2$ released by the compost without specimen) to the maximum amount of $CO_2$ that can be released from the specimen (calculated from the carbon content of the specimen). Biodegradable polyesters or biodegradable polyester mixtures generally exhibit marked signs of degradation after just a few days of composting, examples being fungal growth, cracking, and perforation.

Other methods for determining biodegradability are described by way of example in ASTM D5338 and ASTM D6400.

The semiaromatic polyesters are generally random copolyesters, i.e. the aromatic and aliphatic diacid units are incorporated entirely randomly. The distribution of the lengths of the individual blocks can be calculated by the method of B. Vollmert, *Grundriss der makromolekularen Chemie* [Basic principles of macromolecular chemistry]. As described by Witt et al. in J. Environ. Pol. Degradation, volume 4, No. 1 (1996), page 9, degradation of aromatic model oligomers where n≥3 in compost is normally very slow. However, in the case of semiaromatic polyesters, block structures are rapidly degraded.

The molar mass (Mn) of the preferred semiaromatic polyesters is generally in the range from 1000 to 100 000 g/mol, in particular in the range from 9000 to 75 000 g/mol, preferably in the range from 20 000 to 50 000 g/mol, and their molar mass (Mw) is generally from 50 000 to 300 000 g/mol, preferably from 75 000 to 200 000 g/mol, and their Mw/Mn ratio is generally from 1 to 6, preferably from 2 to 4. The melting point is in the range from 60 to 170° C., preferably in the range from 80 to 150° C.

The MVR (melt volume rate) to EN ISO 1133 (190° C., 2.16 kg weight) after stage 4 is generally from 0.5 to 6.0 cm³/10 min, preferably from 1.0 to 5.0 cm³/10 min, and particularly preferably from 1.5 to 3 cm³/10 min.

The intrinsic viscosities of the biodegradable aliphatic/aromatic polyesters to DIN 53728 are generally high and from 160 to 250 cm³/g, preferably from 170 to 220 cm³/g. The dimension for the intrinsic viscosities below is always cm³/g.

It is desirable to provide aliphatic/aromatic copolyesters which not only have high intrinsic viscosity but also have low acid number to DIN EN 12634. The lower the acid number of the aliphatic/aromatic copolyesters, the greater the hydrolysis resistance of the polyesters, either alone or in a mixture with biopolymers such as starch (thermoplastified or not plastified), polylactide (PLA), polyhydroxyalkanoates, aliphatic polyester such as Bionolle®, cellulose, or polycaprolactone. The shelf life of the polyesters or polyester mixtures improves accordingly.

It is moreover easier to chain-extend the prepolyesters obtainable in stage iii), where these have a small acid number to DIN EN 12634-<1.2 mg KOH/g, preferably <1.0 mg KOH/g, particularly preferably <0.9 mg KOH/g. The result is short residence times with more effective molar mass increase and little increase in acid number in the following stage iv). It is possible to achieve almost complete avoidance of side reactions, or undesired formation of fish eyes. There is a preferred possibility for still further lowering the acid number if the prepolyesters obtained in stage iii) are treated in an intermediate step iva) with acid scavengers, such as d3 and/or d4, and only then subjected to chain extension ivb).

Overall, the biodegradable copolyesters of the invention (chain-extended—see claim 13) with a small acid number and low MVR have the following advantages:
  less molecular weight decrease during processing, such as for example compounding with starch
  better storage stability
  better melt stability during production of foils, and
  because of high molecular weight, excellent performance characteristics in injection molding and in particular during extrusion.

The process of the invention is described in more detail below.

Components A, B, and, if appropriate, C are mixed in a preliminary stage. The materials generally mixed are 1.0 mol equivalent of a mixture composed of aliphatic and aromatic dicarboxylic acids or their ester (component A), from 1.1 to 1.5 mol equivalents, preferably from 1.2 to 1.4 mol equivalents, of aliphatic dihydroxy compounds (component b1), and from 0 to 2% by weight, preferably from 0.01 to 0.5% by weight, based on the amount of polymer after stage iii), of a compound b2; if appropriate, further comonomers (component C) are also premixed.

In one preferred procedure, the dicarboxylic acids are used in the form of free acids (component A). The mixture here is mixed in the abovementioned mixing ratios—without addition of any catalyst—to give a paste, the temperature of which is usually controlled to from 20 to 70° C.

As an alternative to this, the liquid esters of the dicarboxylic acids (component A) are mixed with the dihydroxy compound and, if appropriate, further comonomers, in the abovementioned mixing ratios—without addition of any catalyst—generally at a temperature of from 140 to 200° C.

In a further alternative, one or both dicarboxylic acids is/are esterified in a preliminary stage with the aliphatic dihydroxy compounds to give a purely aliphatic or aromatic polyester, and this is then mixed with the respective other dicarboxylic acid and further aliphatic dihydroxy compound, and also, if appropriate, compound b2. By way of example, polybutylene terephthalate and/or polybutylene adipate can be used in this preliminary stage.

In stage i), the (preliminary-stage) liquid, slurry, and/or paste described above, composed of aliphatic and aromatic dicarboxylic acids (A) and of an aliphatic dihydroxy compound (b1), if appropriate compound (b2), and of further comonomers (component C) is esterified in the presence of from 0.001 to 1% by weight, preferably from 0.03 to 0.2% by weight, based on the amount of polymer after stage iii, of a catalyst, as far as an intrinsic viscosity which is generally from 5 to 15 cm³/g to DIN 53728.

The excess diol component is generally removed by distillation, and after, for example, distillative purification, returned to the circuit.

In stage i), either the entire amount or a portion—preferably from 50 to 80 parts—of the catalyst is metered in. The catalysts used usually comprise zinc compounds, aluminum, and, in particular, titanium compounds. Another advantage of titanium catalysts, such as tetrabutyl orthotitanate or tetra (isopropyl) orthotitanate, when compared with the tin compounds, antimony compounds, cobalt compounds, and lead compounds often used in the literature, e.g. tin dioctanoate, is that residual amounts remaining within the product of the catalyst or downstream products of the catalyst are less toxic. This circumstance is particularly important in the biodegradable polyesters, since they pass directly into the environment, for example in the form of composting bags or mulch foils.

Simultaneously, in stage i), a temperature of from 180 to 260° C. and preferably from 220 to 250° C., and also a pressure of from 0.6 to 1.2 bar and preferably from 0.8 to 1.1 bar are set. Stage i) can be carried out in a mixing assembly, such as a hydrocyclone. Typical residence times are from 1 to 2 hours.

Stage i) and ii) are advantageously carried out in a single reactor, such as a tower reactor (see, for example, WO 03/042278 and DE-A 199 29 790), the reactor having the internals appropriate for each stage.

Further component b1, and also the optional component c), can be added, if appropriate, in stage i) and/or ii). The ratio of component B (diol) to diacids A set in stage i) is generally from 1.5 to 2.5 and preferably from 1.8 to 2.2.

In stage ii), the liquid obtained in stage i (esterification) is fed, together with, if appropriate, the residual amount of catalyst, into a reactor appropriate for the precondensation reaction. Reactors which have proven suitable for the precondensation reaction are a tube-bundle reactor, a reactor cascade, or a bubble column, and in particular a downflow cascade, if appropriate with degassing unit (procedure iia). The reaction temperatures set are generally from 230 to 270° C., preferably from 240 to 260° C., and the pressures set at the start of stage ii) are generally from 0.1 to 0.5 bar, preferably from 0.2 to 0.4 bar, and the pressures set at the end of stage ii) are generally from 5 to 100 mbar, preferably from 5 to 20 mbar. Using residence times of from 60 to 160 minutes, it is possible to produce aliphatic/aromatic prepolyesters whose intrinsic viscosity is from 20 to 60 cm³/g, preferably from 25 to 55 cm³/g, to DIN 53728. The acid numbers to DIN EN 12634 of the prepolyesters can still vary greatly after stage ii) as a function of the production method. If the preliminary stage starts from the free dicarboxylic acids, the acid numbers at the end of stage ii) are still relatively high; however they then fall in stage iii). If the preliminary stage starts from the corresponding dicarboxylic esters, the acid number at the end of stage ii) is comparatively small. However, in this case the acid numbers increase during the course of stage iii). The acid numbers to DIN EN 12634 at the end of stage ii) are generally from 0.7 to 2 mg KOH/g.

The tower reactors described in detail in WO-A 03/042278 and WO-A 05/042615 have proved particularly advantageous for the precondensation reaction ii), in which the product stream is passed cocurrently through a single- or multistage falling-film evaporator, where the reaction vapors—in particular water, THF, and, if dicarboxylic esters are used, alcohols—are drawn off at a plurality of sites distributed over the reactor (procedure iib). The cocurrent procedure described in WO-A 03/042278 and WO-A 05/042615, with continuous removal of the reaction vapors—at least at a plurality of sites—is expressly incorporated herein by way of reference. This procedure in particular has the following advantages:

pumps for conveying of the product stream can substantially be omitted; a simpler gravimetric-flow method can be used for the progress of the product; the reactor can be run at slightly superatmospheric pressure, or atmospheric pressure, or using slightly subatmospheric pressure (see above), in a procedure which is in any case very non-aggressive, the continuous removal of the reaction vapors in situ from the reaction mixture shifts the equilibrium to the side of the reaction products; the rapid removal of the reaction vapors moreover avoids, or at least suppresses, side-reactions;

using the procedure described above, it is generally possible to produce aliphatic/aromatic prepolyesters whose intrinsic viscosity is from 25 to 55 cm³/g to DIN 53728; these prepolyesters moreover have very low acid numbers to DIN EN 12634.

The reaction vapors, which consisted essentially of water and, if dicarboxylic esters are used, of alcohol, or—if the diol 1,4-butanediol is used—of excess diol and THF by-product, are purified by conventional distillation processes and returned to the process.

In the polycondensation step iii), a deactivator for the catalyst is admixed, if appropriate, with the precondensed polyester. Deactivators that can in particular be used are phosphorus compounds: either organophosphites such as phosphonous acid or phosphorous acid. It is particularly advisable to use deactivators if high-reactivity titanium catalysts are used. The amounts that can be added of the deactivators are from 0.001 to 0.1% by weight, preferably from 0.01 to 0.05% by weight, based on the amount of polymer after stage iii). The Ti/P ratio preferably set is from 1.3-1.5:1 and particularly preferably from 1.1-1.3:1.

If appropriate, a color stabilizer for the condensation process is admixed with the precondensed polyester in the polycondensation step iii). Color stabilizers that can be used are in particular phosphorus compounds. Examples are phosphoric acid, phosphorous acid, triphenyl phosphite, triphenyl phosphate, IrgafosPEPQ, sodium hypophosphite and sodium phosphite. These phosphorus compounds can also be used in the form of a mixture. The use of color stabilizers generally leads to a reduction in condensation rate. Triphenyl phosphate is a particularly suitable color stabilizer, since there is no adverse effect on condensation rate.

An amount that can be added of the color stabilizers is from 0.001 to 1.5% by weight, preferably from 0.01 to 1.0% by weight, based on the amount of polymer after stage iii). It is preferable to set a Ti/P ratio (mol/mol) of from 1.0:0.3 to 1.0 and with particular preference from 1.0:0.5 to 1.0.

In the polycondensation step iii), an activator for the condensation process is, if appropriate, admixed with the precondensed polyester. Activators that can be used are in particular phosphorus compounds. Examples are disodium hydrogenphosphate, calcium hypophosphite, calcium phosphite, calcium phosphate, sodium hypophosphite, sodium phosphite, triphenyl phosphite, triphenyl phosphate, trimethyl phosphate, triethyl phosphate, tripropyl phosphate, tributyl phosphate, Irgafos 168. These phosphorus compounds can also be used in the form of a mixture. Particularly suitable activators are disodium hydrogenphosphate and sodium phosphite.

An amount that can be added of the activators is from 0.001 to 1.5% by weight, preferably from 0.01 to 1.0% by weight, based on the amount of polymer after stage iii). It is preferable to set a Ti/P ratio (mol/mol) of from 1.0 to 1.5:1, and with particular preference from 1.1 to 1.3:1.

Combined use of color stabilizer and activator is of particular interest, an example being triphenyl phosphate/disodium hydrogenphosphate.

The polycondensation process takes place in what is known as a finisher. Finishers that have proven particularly suitable are reactors such as a rotating-disk reactor or a cage reactor, these being as described in U.S. Pat. No. 5,779,986 and EP 719582. The latter reactor, in particular, takes account of the fact that the viscosity of the polyester increase with increasing reaction time. Reaction temperatures set are generally from 220 to 270° C., preferably from 230 to 250° C., and pressures set are generally from 0.2 to 5 mbar, preferably from 0.5 to 3 mbar. Using residence times of from 30 to 90 minutes, preferably from 40 to 80 minutes, it is possible to produce aliphatic/aromatic polyesters with intrinsic viscosity to DIN 53728 of from 70 to 130 cm$^3$/g, and acid numbers to DIN EN 12634 of from 0.5 to 1.2 mg KOH/g, preferably from 0.6 to 0.9 mg KOH/g. Typical molecular weights (Mn) are from 10 000 to 25 000, with molecular weights (Mw) of from 35 000 to 70 000 at this stage.

In the chain-extension process (stage iv), the polycondensed polyester is fed into an extruder, or into a continuous kneader (List reactor), or into a static mixer, together with from 0.01 to 4% by weight, preferably from 0.1 to 2% by weight, and with particular preference from 0.5 to 1.2% by weight, based on the polyester. The following internals may be mentioned by way of example: the static mixer can use SMR, SMX, or SMXL elements, or a combination of these, e.g. from Sulzer Chemtech AG, Switzerland. Examples of a List reactor, as a function of application sector, are: a single-shaft DISCOTHERM B or twin-shaft CRP or ORP reactors. Extruders that can be used are single- or twin-screw extruders.

Chain extenders that can be used are the isocyanates or isocyanurates d1, peroxides d2, and epoxides d3a described above. By way of example, these are diisocyanates selected from the group consisting of tolylene 2,4-diisocyanate, tolylene 2,6-diisocyanate, diphenylmethane 4,4'- and 2,4'-diisocyanate, naphthylene 1,5-diisocyanate, xylylene diisocyanate, hexamethylene diisocyanate, pentamethylene diisocyanate, isophorone diisocyanate, and methylenebis(4-isocyanatocyclohexane). Particular preference is given to hexamethylene diisocyanate.

For production of polyesters within the claimed viscosity range which simultaneously have low acid numbers, it can be advantageous to add what are known as acid scavengers, for example components d3 and d4 described in the introduction. The concentration used here is preferably from 0.01 to 2.0% by weight, and in particular from 0.02 to 1.0% by weight, based on the polymer mixture. It is advisable to add the acid scavengers at the start of, during, or at the end of stage iii), or in an upstream step iva) prior to the chain-extension process ivb). Particularly suitable chain extenders are components d1, d2, and d3a. However, it is also possible to add the acid scavengers d3 and d4 after addition of the chain extenders d1 and d2.

The chain extension reaction (polyaddition, stage iv) takes place at reaction temperatures of from 220 to 270° C., preferably from 230 to 250° C., and at superatmospheric pressure or atmospheric pressure, as a function of the system used. Using residence times of from 2 to 30 minutes, preferably from 4 to 15 minutes, it is possible to produce aliphatic/aromatic polyesters whose intrinsic viscosity is from 160 to 250 cm$^3$/g to DIN 53728 and whose acid numbers to DIN EN 12634 are preferably from 0.5 to 1.2 mg KOH/g and particularly preferably from 0.6 to 1.0 mg KOH/g.

MVR (melt volume rate) to EN ISO 1133 (190° C., weight 2.16 kg) after stage 4 is generally from 0.5 to 6.0 cm$^3$/10 min, preferably from 1.0 to 5.0 cm$^3$/10 min, and particularly preferably from 1.5 to 3 cm$^3$/10 min.

While the compounds b2 act as described above in particular as crosslinking agents, the isocyanates act at low temperatures in particular as linear chain extenders. If the chain extension reaction (stage iv) is carried out at relatively high temperatures, in particular at temperatures above 120° C., allophanate formation occurs. The chain extender then also acts as branching agent and has direct influence on the pseudoplasticity of the biodegradable polyesters. The rheology of the melts improves; the biodegradable polyesters are easier to process, for example giving better results when drawn by melt-solidification processes to give foils. The isocyanates d1 have a shear-thinning effect, and this means that viscosity decreases under load.

The reactor in which the chain reaction is carried out has the internals described above, these providing good mixing of the product stream.

Because of the marked viscosity increase during the chain extension reaction, it can be advantageous to run the chain extension reaction in the reactor only until the chain extender has at least reacted fully with a functional unit. The chain length increase can be completed by way of example in a separate stirred vessel or in a tube without internals. This method can avoid blockages and wall deposits.

The fully reacted melt is generally transferred directly by way of a melt filter to the finishing process, for example underwater pelletization.

Aliphatic/aromatic polyesters can be produced with good processability and efficiency using the four-stage process of the invention.

If the precondensation reaction ii) is, for example, carried out in a tower reactor, where the product stream is passed cocurrently through a falling-film evaporator, and the reaction vapors are removed in situ from the reaction mixture, it is possible to obtain prepolyesters whose intrinsic viscosities are from 25 to 55 cm$^3$/g to DIN 53728 and whose acid numbers are simultaneously low: smaller than 0.9 mg KOH/g. If free acids are used—for example terephthalic acid—the acid number in stage ii) can remain relatively high, but in stage iii) it falls to below 0.9 mg KOH/g. These prepolyesters can give more efficient and less aggressive polycondensation, and, particularly using hexamethylene diisocyanate, they can give more efficient and less aggressive chain extension. Using this embodiment of the process of the invention it is possible for the first time to produce aliphatic/aromatic polyesters whose intrinsic viscosity is greater than 160 cm$^3$/g to DIN 53728 and whose acid number is smaller than 1 mg KOH/g, and whose MVR to EN ISO1133 is smaller than 6.0 cm$^3$/10 min.

The polyesters of the invention have excellent processability, because their MVR is low. They also have a very low acid number, and this in turn results in good hydrolysis resistance. The polyesters of the invention are therefore also suitable for the production of biodegradable polymer mixtures comprising one or more components selected from the group consisting of aliphatic polyester, such as Bionolle® (Showa Highpolymer), polycaprolactone, starch (thermoplastified or non-plastified), cellulose, polyhydroxyalkanoates (products of PHB Industrial, Tianan, Metabolix), and polylactic acid, such as NatureWorks® (Cargill).

These biodegradable polyester mixtures generally comprise i) from 5 to 95% by weight, preferably from 20 to 80% by weight, of the polyester of the invention;
ii) from 95 to 5% by weight, preferably from 80 to 20% by weight, of at least one or more components selected from the group consisting of aliphatic polyester, polycaprolactone, starch, cellulose, polyhydroxyalkanoate, and polylactic acid.

In contrast, the aliphatic/aromatic polyesters known from the prior art have the following properties:

|  | Acid number [mg KOH/g] DIN 12634 | Intrinsic viscosity [cm³/g] DIN 53728 | MVR [cm³/10 min] ISO 1133 |
|---|---|---|---|
| EaststarBio ® (PBAT) | 3 | — | 28 |
| EnPol ® G8060 (PBAT) | 6.3 | 174 | 9 |

PBAT = Polybutylene adipate-co-terephthalate

Test Methods:

The acid number was determined to DIN EN 12634 of October 1998. The solvent mixture used comprised a mixture of 1 part by volume of DMSO, 8 parts by volume of propan-2-ol, and 7 parts by volume of toluene. The specimen was heated to 50° C., and the circuit used a single-rod electrode and potassium chloride filling. The standard solution used was tetramethylammonium hydroxide.

Intrinsic viscosity was determined to DIN 53728, part 3, Jan. 3, 1985. The solvent used comprised the following mixture: phenol/dichlorobenzene, 50/50 ratio by weight.

Melt volume flow rate (MVR) was determined to ISO 1133. The test conditions were 190° C., 2.16 kg. The melting time was 4 minutes. The MVR gives the rate of extrusion of a molten plastics molding composition through an extrusion die of defined length and defined diameter under the prescribed conditions: temperature, load, and position of piston. The volume in the barrel of an extrusion plastometer extruded in a defined time is determined.

EXAMPLES

1. Continuous Production of Polybutylene Adipate-co-terephthalate with HDI (Process According to Claims 1 to 4)

To produce the biodegradable polyester, 440 kg/h of dimethyl terephthalate, 510 kg/h of a prepolyester composed of adipic acid and 1,4-butanediol (Mn 2000 g/mol), 270 kg/h of 1,4-butanediol, and 1.0 kg/h of glycerol were added continuously with 0.55 kg/h of tetrabutyl orthotitanate to a multistage stirred-tank cascade. The reaction mixture was transesterified at atmospheric pressure within the stirred-tank cascade at temperatures of from 180° C. to 210° C. and with a residence time of 2.5 h, and the resulting condensation product methanol was removed by distillation. The intrinsic viscosity (IV) of the resultant low-molecular-weight polyester was 10 cm³/g.

The reaction mixture was then heated to 260° C. in a downstream riser-tube reactor, in which the melt is passed (see DE 19509551) through a large number of heated tubes with addition of 0.30 kg/h of tetrabutyl orthotitanate, the pressure is lowered to 100 mbar, and most of the excess butanediol is removed by distillation. After a residence time of 45 minutes, the IV of the polyester was 23 cm³/g.

After addition of 0.28 kg/h of phosphorous acid, the reaction mixture was transferred to a rotating-disk reactor (cf. U.S. Pat. No. 5,779,986) and polycondensed at a temperature of 250° C. and at a pressure of 4 mbar for a further 45 minutes, and the remaining excess of butanediol was removed by distillation. The IV of the resultant polyester was 89 cm³/g and its acid number (AN) was 1.0 mg KOH/g.

After the polycondensation reaction, 8.0 kg/h of hexamethylene diisocyanate (HDI) were metered into the polyester at 240° C., using a static mixing system. After a residence time of 7 minutes, the polyester was pelletized, using an underwater pelletizer, and dried. The IV of the resultant polyester was 191 cm³/g, its molar mass Mn was 36 000 g/mol (and Mw was respectively 125 000 g/mol), its MVR was 3 cm³/10 min, and its AN was 1.1 mg KOH/g. A List reactor was used in a further experiment in stage iv) instead of a static mixer. The polymers thus obtained had comparable properties (acid number, intrinsic viscosity, MVR).

2. Continuous Production of Polybutylene Adipate-co-terephthalate Chain-Extended Using HDI (Process According to Claims 5 and 6)

To produce the biodegradable polyester, 19 kg/h of terephthalic acid, 19 kg/h of adipic acid, 32 kg/h of 1,4-butanediol, and 0.05 kg/h of glycerol were mixed physically at 35° C., and then the mixture was continuously transferred to an esterification reactor (e.g. designed in the form of a hydrocyclone as described by way of example in WO 03/042278 A1). The mixture was esterified at a temperature of 240° C., with a residence time of 1.5 h, and at a pressure of 0.85 bar, with addition of a further 16 kg/h of 1,4-butanediol and 0.022 kg/h of tetrabutyl orthotitanate (TBOT), and the resulting condensation product water was removed by distillation, as also was some of the excess of butanediol. The intrinsic viscosity (IV) of the resultant low-molecular-weight polyester was 12 cm³/g.

The reaction mixture was then passed through a downflow cascade (as described by way of example in WO 03/042278 A1) at a temperature rising from 250 to 260° C., with a residence time of 2 h, and at a pressure falling from 300 mbar to 10 mbar, with addition of a further 0.012 kg of TBOT/h, and most of the excess butanediol was removed by distillation. The intrinsic viscosity (IV) of the resultant polyester was 47 cm³/g.

After addition of 0.01 kg/h of phosphorous acid, the reaction mixture was transferred to a polycondensation reactor (as described by way of example in EP 0719582), and polycondensed at a temperature of 245° C. and at a pressure of 1 mbar for a further 45 minutes, and the remaining excess of butanediol was removed by distillation. The IV of the resultant polyester was 95 cm³/g and its acid number (AN) was 0.6 mg KOH/g. After the polycondensation reaction, 0.4 kg/h of hexamethylene diisocyanate (HDI) were metered into the polyester at 240° C., using a static mixing system. After a residence time of 7 minutes, the polyester was pelletized, using an underwater pelletizer, and dried. The IV of the resultant polyester was 235 cm³/g, its molar mass Mn was 47 000 g/mol (and Mw was respectively 165 000 g/mol), its MVR was 1.9 cm³/10 min, and its AN was 0.7 mg KOH/g. A List reactor was used in a further experiment in stage iv) instead of a static mixer. The polymers thus obtained had comparable properties (acid number, intrinsic viscosity, MVR).

3. Comparative Example of Batchwise Production of Polybutylene Adipate-co-terephthalate Chain-Extended Using HDI To produce the biodegradable polyester, 3700 kg of dimethyl terephthalate, 4300 kg of a prepolyester composed of adipic acid and 1,4-butanediol (Mn 2000 g/mol), 2200 kg of 1,4-butanediol, 8.5 kg of glycerol, and 2.4 kg of tetrabutyl orthotitanate were added to a stirred tank. The reaction mixture was heated in stages within a period of 8 h to a temperature of 245° C., and at the same time the pressure was lowered in stages to 5 mbar, while the excess of 1,4-butanediol was removed by distillation. Subsequently, 0.6 kg of phosphorous acid were then added, with stirring, in vacuo. The intrinsic viscosity (IV) of the resultant polyester was 91 cm³/g and its acid number (AN) was 1.3 mg KOH/g. After the polycondensation reaction, 6.8 kg/h of hexamethylene diisocyanate (HDI) were metered into the polyester at 240° C., using a static mixing system. After a residence time of 7 minutes, the polyester was pelletized, using an underwater pelletizer, and dried. The IV of the resultant polyester was 170 cm³/g, its molar mass Mn was 32 000 g/mol (and Mw was 95 000 g/mol), its MVR was 6.0 cm³/10 min, and its AN was 1.5 mg KOH/g.

The invention claimed is:

1. A process for the continuous production of a biodegradable polyester based on aliphatic or aliphatic and aromatic dicarboxylic acids and on aliphatic dihydroxy compounds, where
    a mixture composed of the aliphatic dihydroxy compounds, of the aliphatic and aromatic dicarboxylic acids, and, optionally, of further comonomers (component C) is mixed, without addition of a catalyst, to give a paste, or, as an alternative, the liquid esters of the dicarboxylic acids are fed into the system, as also are the dihydroxy compound and, optionally, further comonomers, without addition of any catalyst, where
    i) in a first stage, this mixture, together with the entire amount or with a portion of the catalyst, is continuously esterified or, respectively, transesterified;
    ii) in a second stage, the transesterification or, respectively, esterification product obtained in i) is continuously precondensed to an intrinsic viscosity of from 20 to 70 cm³/g to DIN 53728;
    iii) in a third stage, the product obtainable from ii) is continuously polycondensed to an intrinsic viscosity of from 60 to 170 cm³/g to DIN 53728, and
    iv) in a fourth stage, the product obtainable from iii) is reacted continuously with a chain extender D in a polyaddition reaction to an intrinsic viscosity of from 150 to 320 cm³/g to DIN 53728;
    where stage ii) is carried out in a tower reactor, and the product stream is conducted concurrently by way of a falling-film cascade, and the reaction vapors are removed in situ from the reaction mixture.

2. The process according to claim 1, where the biodegradable polyester is composed of:
    A) an acid component composed of
        a1) from 30 to 99 mol % of at least one aliphatic dicarboxylic acid or its esters, or a mixture thereof,
        a2) from 1 to 70 mol % of at least one aromatic dicarboxylic acid or its esters, or a mixture thereof, and
        a3) from 0 to 5 mol % of a compound comprising sulfonate groups,
        where the total of the molar percentages of components a1) to a3) is 100%, and
    B) a diol component composed of:
        b1) at least equimolar amounts with respect to component A of a $C_2$-$C_{12}$ alkanediol, or a mixture thereof, and
        b2) from 0 to 2% by weight, based on components A and b1), of a compound comprising at least 3 functional groups;
        and, optionally, one or more components selected from
    C) a component selected from
        c1) at least one dihydroxy compound comprising ether functions and having the formula I

where n is 2, 3 or 4 and m is a whole number from 2 to 250,
        c2) at least one hydroxycarboxylic acid of the formula IIa or IIb

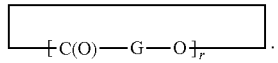

where p is a whole number from 1 to 1500 and r is a whole number from 1 to 4, and G is a radical selected from the group consisting of phenylene, —$(CH_2)_q$—, where q is a whole number from 1 to 5, —C(R)H— and —C(R)HCH$_2$, where R is methyl or ethyl,
        c3) at least one amino-$C_2$-$C_{12}$ alkanol, or at least one amino-$C_5$-$C_{10}$ cycloalkanol, or a mixture of these,
        c4) at least one diamino-$C_1$-$C_8$ alkane,
        c5) at least one aminocarboxylic acid compound selected from the group consisting of caprolactam, 1,6-aminocaproic acid, laurolactam, 1,12-aminolauric acid, and 1,11-aminoundecanoic acid,
        or mixtures composed of c1) bis c5),
        and
    D) from 0.01 to 4% by weight, based on the amount of polyester after stage iii, of at least one component selected from the group d1) to d4)
        d1) of a di- or oligofunctional isocyanate and/or isocyanurate,
        d2) of a di- or oligofunctional peroxide,
        d3) of a di- or oligofunctional epoxide,
        d4) of a di- or oligofunctional oxazoline, oxazine, caprolactam, and/or carbodiimide;
    E) from 0 to 10% by weight, based on the amount of polyester after stage iii of a component selected from the group e1) to e3)
        e1) of a lubricant,
        e2) of a nucleating agent,
        e3) of an aliphatic polyester selected from the group consisting of: polylactic acid, polycaprolactone, polyhydroxyalkanoate.

3. The process according to claim 1, where the biodegradable polyester comprises, as aliphatic dicarboxylic acid (component a1)), succinic acid, adipic acid, or sebacic acid, esters thereof, or a mixture of these;
    as aromatic dicarboxylic acid (component a2)), terephthalic acid or its esters;
    as diol component (component B), 1,4-butanediol or 1,3-propanediol, as component b2) glycerol, pentaerythritol, trimethylolpropane, and, as component d1), hexamethylene diisocyanate.

4. The process according to claim 1, where the esterification/transesterification (stage i)) uses a hydrocyclone with attached heat exchange, and stage i), ii), and iii) is carried out in the presence of a titanium catalyst.

5. The process according to claim 1, where, in stage ii), the transesterification product or esterification product is precondensed to an intrinsic viscosity of from 25 to 55 cm$^3$/g to DIN 53728.

6. The process according to claim 1, where, between stage ii) and iii), from 0.001 to 0.1% by weight of a deactivating phosphorus compound, or from 0.001 to 1.5% by weight of a color-stabilizing or activating phosphorus compound, is added to the product stream.

7. The process according to claim 1, where, at the start of, during, or at the end of stage iii, or in an upstream step iva of the chain-extension process ivb, from 0.01 to 2.0% by weight, based on the respective polymer composition, of an acid scavenger selected from the group of a di- or oligofunctional epoxide (d3), oxazoline, oxazine, caprolactam, and/or carbodiimide (d4) is added.

8. The process according to claim 1, where stage iii) is carried out in a rotating-disk reactor or cage reactor.

9. The process according to claim 1, where, after stage iii), from 0.05 to 2.0% by weight, based on the polymer composition after stage iii, of a lubricant e1 is added.

10. The process according to claim 1, where, after stage iii), from 0.05 to 5.0% by weight, based on the polymer composition after stage iii, of a nucleating agent e2 is added.

11. The process according to claim 1, where, after stage iii), from 0.05 to 15.0% by weight, based on the polymer composition after stage iii, of a compatibilizer e3 is added.

12. The process according to claim 1, where stage iv) is carried out in an extruder, List reactor, or static mixer.

13. The process according to claim 12, where, in stage iv), hexamethylene diisocyanate (component d1) is used as chain extender.

14. The process according to claim 2, wherein the lubricant is erucamide or a stearate.

15. The process according to claim 2, wherein the nucleating agent is calcium carbonate, polyethylene terephthalate, or polybutylene terephthalate.

16. The process according to claim 1, wherein the biodegradable polyester has an acid number, measured to DIN EN 12634, which is smaller than 1.0 mg KOH/g.

* * * * *